United States Patent [19]
Aggarwal

[11] 3,961,656
[45] June 8, 1976

[54] PHONOGRAPH RECORD INSULATOR

[76] Inventor: Lalit K. Aggarwal, 3718 Spring Garden St., Philadelphia, Pa. 19104

[22] Filed: Apr. 30, 1975

[21] Appl. No.: 573,246

[52] U.S. Cl. .............................. 150/52 R; 274/1 R; 274/47
[51] Int. Cl.² .................... B65B 11/00; B65D 65/04
[58] Field of Search .................... 274/47, 42, 1 R; 206/313, 312, 311, 310, 309; 150/52 R

[56] References Cited
UNITED STATES PATENTS

| | | | |
|---|---|---|---|
| 3,094,208 | 6/1963 | Evans | 206/312 |
| 3,110,501 | 11/1963 | Winchell | 274/42 R |
| 3,145,026 | 8/1964 | Shaw | 206/309 |
| 3,668,658 | 6/1972 | Flores et al. | 274/47 |

FOREIGN PATENTS OR APPLICATIONS

| | | | |
|---|---|---|---|
| 767,815 | 5/1934 | France | 206/312 |
| 1,166,839 | 6/1958 | France | 206/310 |

Primary Examiner—Richard E. Aegerter
Assistant Examiner—Steven L. Stephan
Attorney, Agent, or Firm—Dorfman, Herrell and Skillman

[57] ABSTRACT

Two protective cover members are provided with adhesive material so that one member can be attached to and removed from each side of a record. The members include spacers to hold the records apart and an electrically conductive layer to help eliminate static charge buildup.

8 Claims, 6 Drawing Figures

PHONOGRAPH RECORD INSULATOR

BACKGROUND OF INVENTION

The invention proposes a pair of covers to remove electrostatic charges from the surface of a phonograph record and to prevent its deterioration. Phonograph records, which are made of synthetic resin, accumulate electrostatic charges on their surfaces as a result of friction between the needle and the grooves. The electrostatic charges, in turn, attract dust particles to the record's surface. This results in the deterioration of a phonograph record and adversely affects the sound produced from such a record. The damage caused by dust particles to a phonograph record is more serious if the pick-up arm of a phonograph record player is designed to operate below three grams.

Manual handling can also damage the surface of a phonograph record. In particular, when a record is removed, or inserted, from its cover, the dust on the surface acts as an abrasive agent causing surface scratches. Natural oils from the finger tips can also be transferred onto the surface of a phonograph record in the process of handling; this causes further damage to a phonograph record.

In addition, if an automatic record changer is used to play phonograph records, the impact of a falling record can damage the sound track, particularly if a phonograph record is warped. Also, dust particles trapped between the surfaces of two phonograph records being played on an automatic changer act as abrasive agents scratching the surfaces in their contact.

Finally, in the course of playing a phonograph record, both of its surfaces are exposed to dust and other sources of contamination; when in fact, for the purpose of reproducing sound, it is necessary that only the surface in contact with the needle be exposed. The unnecessary exposure of the recorded surface, not being used to reproduce sound, to dust and oil increases the probability of surface damage.

It is of prime importance in keeping phonograph records in good condition and to produce good undistorted sound that the surfaces of phonograph records are kept free of electrostatic charges, dust, oils, etc., and the exposure to the record's surface not being used for the reproduction of sound be curtailed.

The antistatic films applied to the surface of a phonograph record, in the form of sprays or lotions, to prevent electrostatic charges have indicated problems in their use. In particular, if the pick-up arm of a record player operates below three grams, the needle presses with such small force along the groove that it is unable to displace the leftovers of antistatic film. Consequently, the needle skates over the sound track resulting in the distortion of sound. Other devices, for example parastat and dust-bug are also available as means to remove static electricity from the surface of a phonograph record. Both of these devices require moisture to provide a leakage way for electrostatic charge; some of the moisture may be transferred to the surface of a record and can produce the skating effect discussed earlier.

A number of devices are available to remove dust from the surface of a phonograph record. Nevertheless, deterioration of phonograph records cannot be prevented with such devices. These devices, it should be noted, are meant to be curative rather than preventive against damages to a record's surface; but, micro-grooves and sophisticated pick-up system make it necessary for reproducing good undistorted sound that dust and other damaging materials be not allowed to accumulate on a record's surface in the first place.

Therefore, in order to reproduce undistorted sound from a phonograph record, it is essential that a record's surface be (1) without electrostatic charges, (2) free of dust, grease, etc., and (3) should be protected to prevent surface scratches during normal use and handling. A cover which is designed to achieve these desired results, along with an attractive and durable surface which can be used to print information and displays, is the central object of this invention.

SUMMARY OF THE INVENTION

It is an object of this invention to provide a pair of insulators for phonograph records which entirely covers the surfaces of a phonograph record, except for the raised circular area at the center which is used for labelling a phonograph record. In this way, the pair of insulators protects the surfaces of a phonograph record from dust, oil, and other substances injurious to recorded surface.

In accordance with the preceding object, it is another object of the invention to provide means for attaching the record insulators to the surfaces of a phonograph record. And, the insulators should only temporarily seal the outside perimeter of a phonograph record; i.e., it should be possible to remove and replace insulators several times with ease and without damage either to recorded surfaces of a record or record insulators.

In connection with the foregoing objects, it is still another object of the invention to provide the outside surface of insulators, not in touch with the recorded surface, a nonporous, easily cleanable, water and damp proof material.

Another object of the invention is to provide the inner surface of insulators, in touch with the recorded surface, a metalic foil to conduct electrostatic charges off the recorded surface.

In conjunction with the preceding object, it is another object of the invention to extend the metalic foil to the outside surfaces of insulators, so it can be easily earthed or grounded.

It is still another object of the invention to provide separation between the surfaces of two different phonograph records, during the period they are simultaneously placed on a turntable.

In conjunction with the preceding object, it is another object of the invention to place spacers of soft material, rubber or felt, along the outer and inner perimeters of the outside surface of an insulator.

In accordance with the preceding objects, it is a final object of this invention to provide an attractive, durable, and economical pair of record insulators to store phonograph records.

Other features of the invention describe the particular arrangement of the various parts of the record insulator and the manner in which the record insulator is attached to the surface of a phonograph record. The objects, the functioning of the invention, and other advantages and objects of the invention will best be understood from the study of the following specifications in conjunction with the accompanying drawings.

DESCRIPTION OF PREFERRED EMBODIMENT

Figure 1:
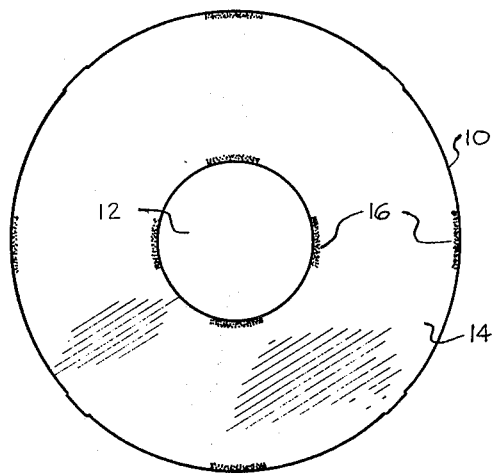
FIG. 1 is a plan view showing the inner, or metal foil, side of a record insulator.

In FIG. 1 is shown the inner side of a record insulator 10 with a circular hole 12 and metal foil 14 applied to the entire inner surface of a record insulator. A pressure sensitive adhesive 16, a particular adhesive may be 3M brand 55 spray adhesive or equivalent, is applied to the metal foil at designated locations along its inner and outer perimeters.

Figure 2:
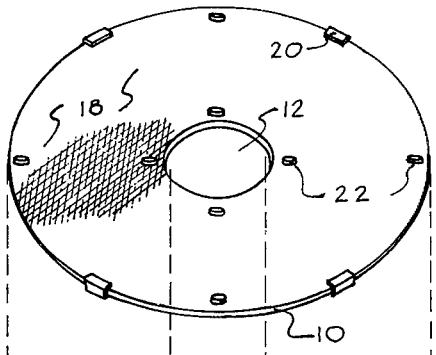
FIG. 2 is a plan view of a record insulator showing its outer surface, the spacers, and strips of metal foil.
Figure 2:
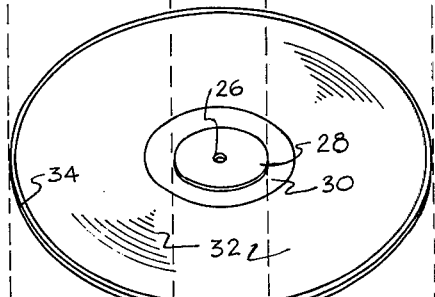
Figure 2:
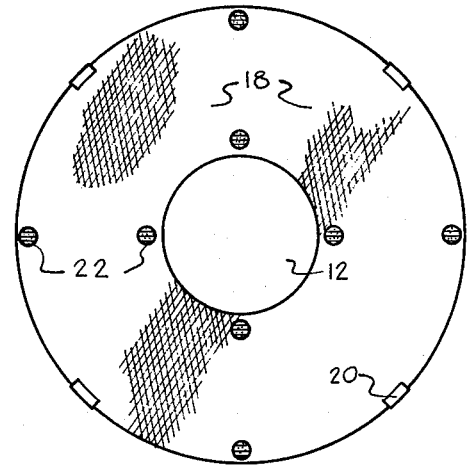

In FIG. 2, the outer side of a record insulator is shown. The outer side 18 is made of thin, non-porous, water-proof, dust-proof, stain-proof, flat and flexible material. Many different types of plastic sheets, or waxed paper, or any other material with these properties, approximately 1/64 inch thick, can be used to comprise 18. The metal foil 14, which forms the inner surface of a record insulator, is permanently affixed to 18 and folded over along the perimeter of the outer surface in the form of small strips 20. Also, approximately ⅛ inch diameter and 1/16 inch thick spacers 22 made of felt or rubber, or a material with similar properties, are permanently affixed to 18 along its outer and inner perimeters at designated places, FIG. 2.

Figure 3:
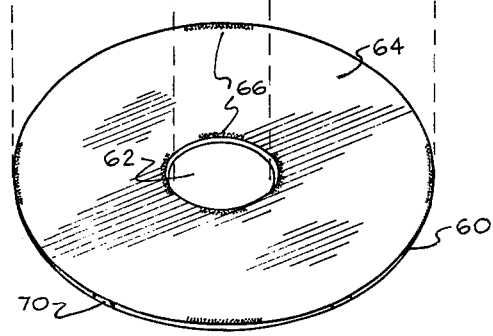
FIG. 3 is a perspective view showing a pair of record insulators and a phonograph record.

FIG. 3 shows a preferred embodiment of a record insulator 10 and another insulator 60, of the same construction as 10, in a phonograph record 24. The phonograph record 24 has five distinct parts. There is a circular hole 26 at the center of 24; a standardized raised circular disc 28, which is used to print information about a phonograph record; a circular strip 30 without recorded music, which varies in size; a surface of recorded music 32, which also varies in size according to the size of 30; and, a thin circular strip 34 along the perimeter of 24 without recorded music. In 33 rpm records, 34 is raised slightly above the recorded surface 32 to prevent rubbing between the recorded surfaces when two records are stacked one on top of the other. Record insulators 10 and 60 extend approximately 1/32 inch beyond the perimeter of 24. The circular holes 12 and 62 are approximately ⅛ inch larger in diameter than the diameter of the circular disc 28 of the phonograph record 24; this allows 12 and 62 to loosely fit around 28 when record insulators 10 and 60 are attached to 24.

Figure 4:
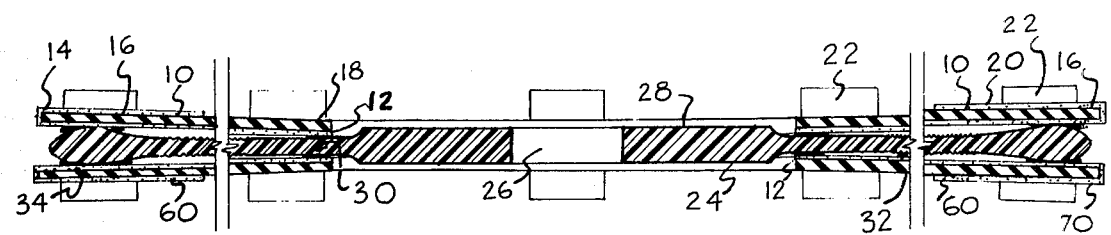
FIG. 4 is a cross-sectional view showing the preferred embodiment of record insulators and a phonograph record.

In FIG. 4 are shown two record insulators 10 and 60, both of the same construction, attached to a phonograph record 24. Before applying a record insulator, the surfaces of a phonograph record should be clean. Then, a record insulator 10 is placed on 24 in such a manner that the circular hole 12 evenly surrounds the circular disc 28 and the metal foiled surface 14 is in touch with the recorded surface 32. After placing the insulator on the phonograph record as described above, slight pressure is applied with fingers (not shown) at 16 so that the insulator is temporarily affixed to 30 and 34 sections of the phonograph record 24. The same operation is carried out on the second surface of 24 and the second record insulator 60. After the record insulators are applied to both sides of the phonograph record 24, they form a protective package to store the phonograph record. And, electrostatic charges can be removed from the recorded surface 32 by grounding the metal foil strips 20 and 70 with fingers. This helps in reducing the accumulation of dust particles attracted to a record's surface by electrostatic charges.

Figure 5:
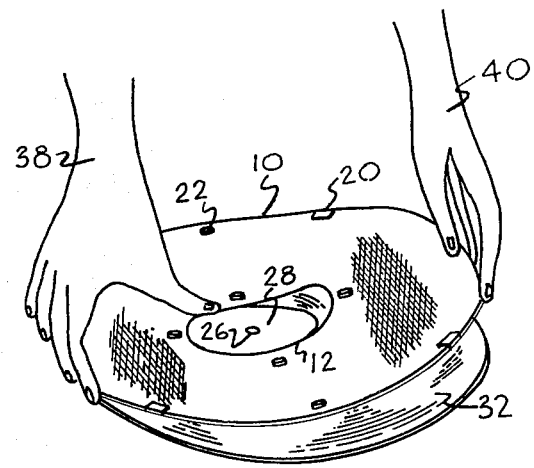
FIG. 5 is a perspective view showing a way to remove a record insulator from the surface of a record.

Now, to reproduce music, it is necessary to expose only the recorded surface from which music is intended to be reproduced, the other surface can remain covered. FIG. 5 shows how to remove a record insulator from the surface of a phonograph record. Use the hand 38 to hold the record and then lift the edge of the record insulator 10 with the other hand 40 giving a slight pull away from the surface of the phonograph record until the recorded surface 32 is completely exposed.

Figure 6:
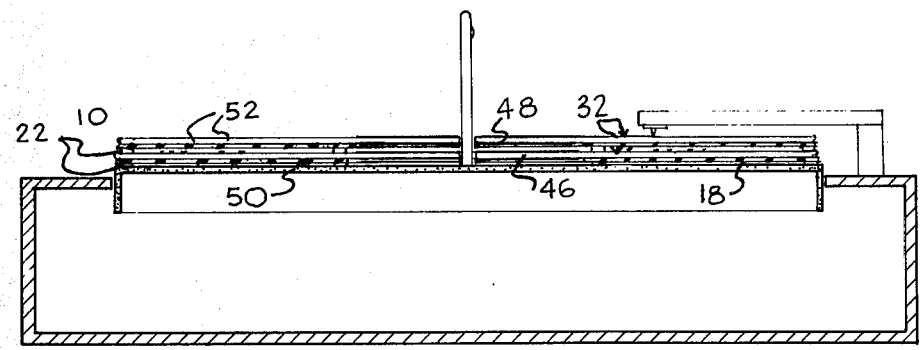
FIG. 6 is a cross-sectional view through a phonograph turntable and two phonograph records each covered with a record insulator on one side.

In FIG. 6 is shown a cross-section through a phonograph turntable 50 and two phonograph records 46 and 48. The surfaces of 46 and 48 facing the turntable 50 are covered with record insulators; whereas, the surfaces of 46 and 48 facing up are without record insulators. When more than one phonograph record is placed on the turntable 50, the spacers 22 are helpful in reducing the probability that dust particles 52 trapped between 46 and 48 will scratch the recorded surface of 46, even if the surfaces of 46 and 48 are warped. Also, the insulator 10 protects the recorded surface 32 from dust which accumulates on the turntable 50.

Furthermore, it should be pointed out that the surface 18 can be used to print information and displays desired by a manufacturer. The surfaces 14 and 18 can be kept clean by simply wiping with a clean, damp, and soft material (not shown).

This explains the construction and specification of the preferred embodiment of the invention. It will be clear from this information that a pair of record insulators have been provided to maintain and protect the surfaces of a phonograph record free of dust and electrostatic charges, consistent with the objects and advantages of the invention stated earlier.

While a certain representative embodiment and details have been shown for the purpose of illustrating the invention, it will be apparent to those skilled in this art that various changes and modifications may be made therein without departing from the spirit or scope of the invention.

I claim:

1. A pair of record insulators for covering the surfaces of a phonograph record, each of said record insulators having a hole at the center and an inner surface operable to contact one of the surfaces of the said phonograph record, and an outer surface opposite said inner surface, said inner surface comprising a layer of electrically-conductive material permanently affixed to the layer comprising the outer surface of the said record insulator, said layer of conductive material having an extended portion turned back and overlying the said outer surface layer at the periphery of the insulator, said record insulator being shaped and sized to fit the phonograph record, and having releasable mounting means engaging the perimeter of said record to temporarily maintain said insulator in place on said record, said mounting means affording removal of only the insulator of said pair covering the side of the record to be played, so that the other side of the said phonograph record can remain covered by the other of the pair of record insulators while playing the phonograph record on conventional phonograph record players.

2. A record insulator according to claim 1 comprising pressure-sensitive adhesive at the inner and outer perimeter of said inner surface and being of a substance such that said insulator can be temporarily sealed to the record on application of said record insulator thereto, and can be removed and reapplied several times without damaging either the record insulator or the said phonograph record.

3. A record insulator according to claim 1 characterized in that said record insulator is flexible so that it may be peeled from the record surface to release the temporary mount provided by said mounting means.

4. In the combination set forth in claim 1, wherein said layer of electrically-conductive material on the inner surface of the said record insulator is made of metallic foil and said mounting means position said foil in contact with the recorded surface of the said phonograph record to remove the electrostatic charges from the said recorded surface when said foil is grounded.

5. A record insulator according to claim 1 characterized in that the outer surface of the said record insulator is made of non-porous, easily cleanable, water and damp-proof material to protect the surfaces of the phonograph record from exposure to dust, oil, and other materials.

6. A record insulator according to claim 1 characterized in that the outer surface of the said record insulator is of a material which may be used for printing information thereon.

7. A pair of record insulators for covering the surfaces of a phonograph record, each record insulator having a hole at the center and an inner surface operable to contact one of the surfaces of the said phonograph record, and an outer surface opposite said inner surface, said outer surface comprising a layer of non-porous, easily cleanable, water and damp-proof material, having spacers along its outer and inner perimeter, whereby spacing between the records is increased, said record insulators being shaped and sized to fit the phonograph record, and having releasable mounting means engaging the perimeter of said record to temporarily maintain each of said pair of insulators in place on one of the sides of said record, said mounting means affording removal of only the insulator of said pair covering the side of the record to be played, so that the other side of the said phonograph record can remain covered by the other of the pair of record insulators while playing the phonograph record on conventional phonograph record players.

8. A record insulator for covering a surface of a phonograph record having a central hole, an inner periphery surrounding said hole, an outer periphery spaced from said inner periphery, and a playing surface between said inner and outer peripheries, said record insulator having an outer periphery, a hole at the center to define an inner periphery and an inner surface layer operable to contact the playing surface of the said phonograph record, and an outer surface layer opposite said inner surface, said inner surface layer comprising electrically-conductive material permanently affixed to the outer layer of the said record insulator, said layer of conductive material having an extended portion turned back and overlying the said outer surface layer at one of the peripheries of the insulator, and spacer elements on the outer surface of said insulator confined to the inner and outer peripheries of the insulator so as to overlie the inner and outer perimeter of said record to increase the separation between the playing surface of the record and a succeeding record placed on top of said insulator, said record insulator being shaped and sized to fit the phonograph record, and having releasable mounting means engaging the perimeter of said record to temporarily maintain said insulator in place on said record.

* * * * *